United States Patent [19]

Breuer et al.

[11] Patent Number: 5,011,305
[45] Date of Patent: Apr. 30, 1991

[54] CAGE FOR A SECTORIAL ANTIFRICTION BEARING

[75] Inventors: Bernhard Breuer, Garstadt; Johannes Schottdorf, Hammelburg, both of Fed. Rep. of Germany

[73] Assignee: FAG Kugelfischer Georg Schafer (KGaA), Fed. Rep. of Germany

[21] Appl. No.: 335,786

[22] PCT Filed: Jul. 30, 1988

[86] PCT No.: PCT/DE88/00474

§ 371 Date: Mar. 30, 1989

§ 102(e) Date: Mar. 30, 1989

[87] PCT Pub. No.: WO89/01095

PCT Pub. Date: Feb. 9, 1989

[30] Foreign Application Priority Data

Jul. 31, 1987 [DE] Fed. Rep. of Germany ... 8710514[U]

[51] Int. Cl.⁵ .......................... F16C 33/46; F01B 3/00; F04B 1/20
[52] U.S. Cl. ........................................ 384/572; 91/505
[58] Field of Search ................. 384/51, 550, 572–580; 91/503–506; 92/12.2

[56] References Cited

U.S. PATENT DOCUMENTS

| 4,029,367 | 6/1977 | Schwede et al. | 384/2 |
| 4,858,480 | 8/1989 | Rohde et al. | 91/505 X |

FOREIGN PATENT DOCUMENTS

| 2625298 | 12/1977 | Fed. Rep. of Germany . | |
| 2730408 | 1/1979 | Fed. Rep. of Germany | 384/584 |
| 2826928 | 1/1980 | Fed. Rep. of Germany | 384/51 |
| 3000921 | 7/1981 | Fed. Rep. of Germany | 91/505 |
| 3610914 | 1/1987 | Fed. Rep. of Germany | 91/505 |
| 0030484 | 2/1985 | Japan | 91/505 |
| 823626 | 4/1981 | U.S.S.R. | 91/505 |

Primary Examiner—Thomas R. Hannon
Attorney, Agent, or Firm—Ostrolenk, Faber, Gerb & Soffen

[57] ABSTRACT

Support pins of a locating device for resetting the position of a cage of a sectorial antifriction bearing—if the cage deviates from its specified position. In order to arrange the support pins reliably securely and at low cost on the cage, the cage is constructed as a solid one and is provided with at least one of the pins which extends parallel with the pockets for the rolling elements and which protrudes beyond the width of the cage.

8 Claims, 1 Drawing Sheet

CAGE FOR A SECTORIAL ANTIFRICTION BEARING

The present invention relates to a cage for a sectorial antifriction bearing wherein support pins of a locating device for resetting the cage, if it deviates from its specified position, are arranged on the cage, and in which the cage is a solid one and least one pin extends parallel with the pockets for the rolling elements and protrudes beyond the width of the cage.

A locating device for the cage of a sectorial antifriction bearing is known from German application No. DE-OS-26 25 298, according to which a resilient guide fork encompasses a support pin joined to the cage and exerts a restoring force on the cage if the latter deviates from its specified position. Such devices are used for mounting the cradle of a swash-plate machine.

It has been found that in practice it is difficult to arrange the support pin on the cage,. This is because the latter is a flat metal strip and the restoring forces occurring at the support pin/cage joint cause rapid wear of the cage and guide fork.

It is an aim of the invention to improve a cage of the kind referred to in the opening paragraph in such a way that the support pins can be arranged by simple means securely, reliably and at low cost on the cage so that the occurring normally restoring forces will not cause any wear. The invention will now be explained with reference to one embodiment thereof:

Figure 1:
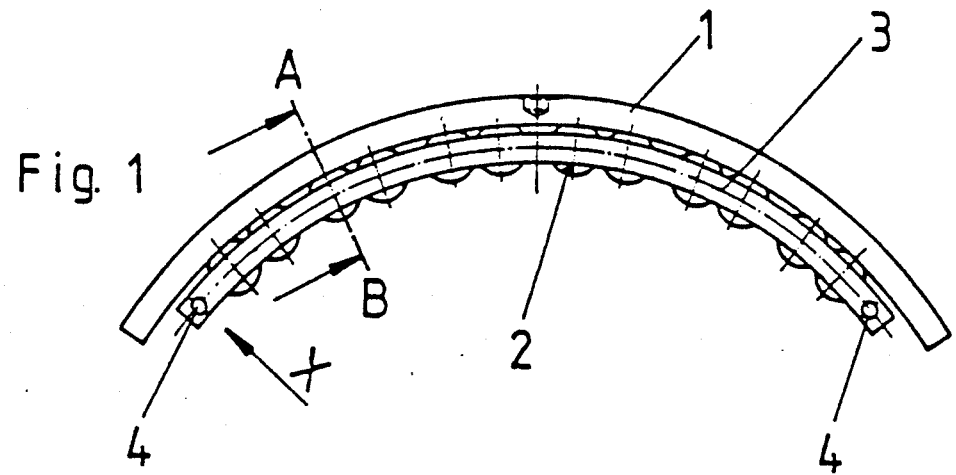
FIG. 1 is a front view of a sectorial antifriction bearing including a cage according to the invention.
Figure 2:
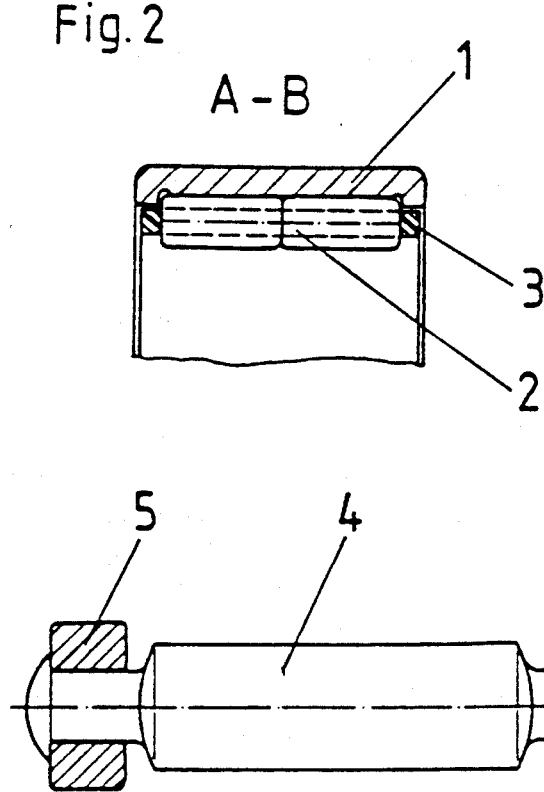
FIG. 2 is a side view, in cross-section, at line A-B- of FIG. 1.
Figure 3:
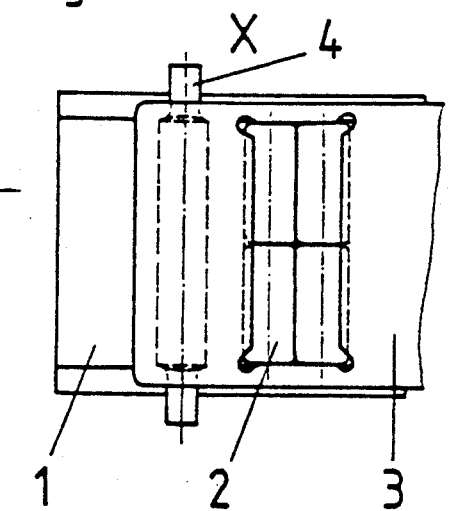
FIG. 3 is a view in the direction of the arrow "X" in FIG. 1.
Figure 4:
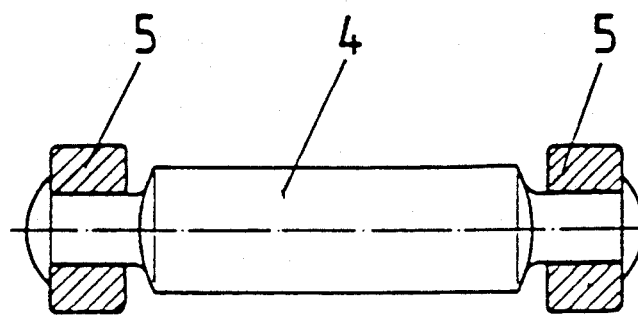
FIG. 4 is a view illustrating the arrangement of a bush on each protruding end portion of a pin.
Figure 5:
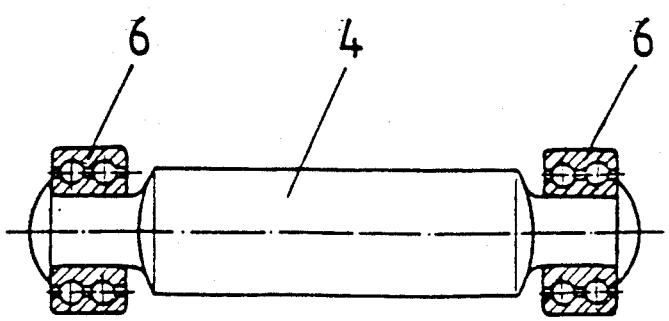
FIG. 5 is a view illustrating the arrangement of an antifriction bearing on each protruding end portion of the pin.

A sectorial antifriction bearing comprises an outer-race sector 1 on which rolling elements 2 are arranged to roll. The latter are disposed in pockets of a cage sector 3, each pocket being arranged to accommodate the rolling elements of two respective annular rows. An inner race (not illustrated) is formed by a cradle. A bore extending parallel with the cage pockets is arranged at each end portion at the circumferential ends of the cage or, optionally, within the cage. A pin 4 is disposed in each of the bores, protrudes beyond the width of the cage and serves as a support pin for a resilient guide fork (not illustrated). Each pin 4 is extrusion coated with cage material and extends parallel to the cage pockets. As a result, the occurring restoring forces applied by the guide fork can securely, wear-resistantly and at low cost be transmitted to the cage.

A bush 5 which interacts with the guide fork, is arranged on each protruding end portion of the pin 4 so as to reduce any friction which may occur. An antifriction bearing 6, instead of the bush, may be arranged on the pin 4.

We claim:

1. A cage for a sectorial antifriction bearing, the cage including a solid body in the shape of an arcuate sector having opposite circumferential ends, the cage also having opposite lateral sides, a plurality of parallel pockets extending in a direction across the solid cage body and toward the lateral sides, each pocket for receiving an antifriction bearing rolling element therein;

at least one support pin located toward at least each end of the cage body and extending parallel to the pockets and extending of a length to protrude beyond one lateral side of the cage for cooperating with a locating device for resetting the cage.

2. The cage of claim 1, wherein there is a respective pin at each opposite lateral side at each arcuate end of the cage.

3. The cage of claim 2, wherein the cage body has a respective bore therein for each of the pins, and each of the bores extending parallel to the direction of extension of the pockets for holding and positioning and orienting the respective pins in the bores.

4. The cage of claim 1, wherein there is a respective pin at each lateral side of the cage.

5. The sectorial antifriction bearing of claim 1, wherein the cage body has a respective bore therein for each of the pins, and each of the bores extending parallel to the direction of extension of the pockets for holding and positioning and orienting the respective pins in the bores.

6. The cage of claim 1, wherein the cage is comprised of a cage material and each pin is extrusion coated with the cage material.

7. The cage of claim 1, further comprising a bush rotatably arranged on each of the pins.

8. The cage of claim 1, further comprising an antifriction bearing arranged on each of the pins.

* * * * *